United States Patent
Park (10) Patent No.: US 9,129,615 B2
(45) Date of Patent: Sep. 8, 2015

(54) TILT ADJUSTING APPARATUS AND OPTICAL DISC DRIVE USING THE SAME

(71) Applicant: Toshiba Samsung Storage Technology Korea Corporation, Suwon-si (KR)

(72) Inventor: Seong-yeon Park, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 14/187,721

(22) Filed: Feb. 24, 2014

(65) Prior Publication Data
US 2014/0245330 A1 Aug. 28, 2014

(30) Foreign Application Priority Data
Feb. 25, 2013 (KR) .................. 10-2013-0020025

(51) Int. Cl.
*G11B 7/00* (2006.01)
*G11B 7/08* (2006.01)

(52) U.S. Cl.
CPC ...................... *G11B 7/082* (2013.01)

(58) Field of Classification Search
CPC ... G11B 7/082; G11B 7/08582; A01B 12/006
USPC .................................................. 720/674–677
See application file for complete search history.

(56) References Cited

U.S. PATENT DOCUMENTS

| | | | | |
|---|---|---|---|---|
| 5,982,735 A | * | 11/1999 | Tsai | 720/675 |
| 2001/0005356 A1 | * | 6/2001 | Park | 369/255 |
| 2002/0136152 A1 | * | 9/2002 | Ko | 369/249 |
| 2004/0004774 A1 | * | 1/2004 | Fujita | 359/814 |
| 2007/0186226 A1 | | 8/2007 | Omori et al. | |
| 2007/0283374 A1 | * | 12/2007 | Ho | 720/677 |

FOREIGN PATENT DOCUMENTS

| | | |
|---|---|---|
| JP | 11-175981 A | 7/1999 |
| JP | 2002-42432 A | 2/2002 |
| JP | 2006-65910 A | 3/2006 |

\* cited by examiner

*Primary Examiner* — Gustavo Polo
(74) *Attorney, Agent, or Firm* — NSIP Law (57) ABSTRACT

Provided is a tilt adjusting apparatus of an optical disc drive for adjusting a tilt of an optical pickup unit. The tilt adjusting apparatus includes an optical pickup unit moving in a radial direction of the disc, along first and second guide shafts. The tilt adjusting unit also includes a fixing support unit that fixes the first guide shaft and an adjustment supporting unit that supports the second guide shaft and enables the height of both ends of the second guide shaft to be adjusted.

19 Claims, 7 Drawing Sheets

TILT ADJUSTING APPARATUS AND OPTICAL DISC DRIVE USING THE SAME

CROSS-REFERENCE TO RELATED APPLICATION(S)

This application claims the benefit under 35 USC §119(a) of Korean Patent Application No. 10-2013-0020025, filed on Feb. 25, 2013, in the Korean Intellectual Property Office, the entire disclosure of which is incorporated herein by reference for all purposes.

BACKGROUND

1. Field

The following description relates to a tilt adjusting apparatus and an optical disc drive using the same, and more particularly, to a tilt adjusting apparatus having a simplified structure.

2. Description of Related Art

An optical disc drive emits light to a disc such as compact disc (CD) or digital video disc (DVD) to write and read information to and from the disc. The optical disc drive includes a spindle motor that rotates the disc, and an optical pickup unit that records data on and reads data from the disc. The optical pickup unit may be moved by a transfer motor in a radial direction of the disc.

For example, for an optical disc drive to write a signal to a recording surface of an optical disc and read a recorded signal, light emitted from an optical pickup unit of the optical disc drive may be perpendicularly incident on the recording surface of the disc.

However, because an optical path of the optical pickup unit is tilted or the spindle motor on which the disc is mounted is tilted, an angular error often occurs because an optical axis of the optical pickup unit and the recording surface of the disc are not perpendicular to each other. This tilt is referred to as a skew. The skew can cause optical aberration, which deteriorates reading a signal from the recording surface of the optical disc.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, there is provided a tilt adjusting apparatus of an optical disc drive for adjusting a tilt of an optical pickup unit such that light emitted from the optical pickup unit is incident on a recording side of a disc, the tilt adjusting apparatus including a pickup base, first and second guide shafts installed in the pickup base, an optical pickup unit configured to move in a radial direction of the disc along the first and second guide shafts, a fixing support unit that supports both ends of the first guide shaft at a fixed height, and an adjustment supporting unit supporting both ends of the second guide shaft and being configured to adjust the height of both ends of the second guide shaft.

A height of the second guide shaft may be adjusted while a height of the first guide shaft is fixed by the fixing support causing a tilt of the optical pickup in a tangential direction perpendicular to a radial direction of the disc.

The fixing support unit may comprise a first fixing unit receiving and fixing one end of the first guide shaft, and a second fixing unit engaging and fixing another end of the first guide shaft.

The second fixing unit may comprise a supporting member installed in the pickup base and supporting one end of the first guide shaft, and a fixing member coupled to the supporting member and fixing another end of the first guide shaft to the supporting member.

The supporting member may comprise a coupling groove to which the fixing member is coupled, and a contacting portion contacting the first guide shaft.

The adjustment supporting unit may comprise a first adjusting unit supporting one end of the second guide shaft and being configured to adjust a height thereof, and a second adjusting unit supporting another end of the second guide shaft and being configured to adjust the height thereof.

The first and second adjusting units may each comprise a supporting member installed in the pickup base, an elastic member that has one end supported by the supporting member and which provides elasticity to the second guide shaft, and an adjusting screw coupled to the supporting member and having a head contacting the second guide shaft.

The supporting member may comprise a separation preventing groove that prevents separation of the elastic member from the supporting member, and a coupling groove to which the adjusting screw is coupled.

The tilt adjusting apparatus may further comprise a pickup transfer unit that is configured to transfer the optical pickup unit, wherein the first guide shaft is disposed toward the pickup transfer unit.

The pickup moving unit may comprise a lead screw that is disposed in parallel with the first guide shaft, and a transfer motor rotating the lead screw.

The optical pickup unit may comprises at least one objective lens, and an actuator driving the at least one objective lens.

The actuator may adjust a tilt of the at least one objective lens towards a radial direction of the disc.

The actuator may be driven in three dimensions to allow the at least one objective lens to perform focusing driving, tracking driving, and radial tilt driving with respect to the disc.

The actuator may comprise a blade supporting the at least one objective lens, a plurality of suspension wires extending in a tangential direction and supporting the blade to elastically move, a plurality of magnetic members that are facing each other and that have the blade provided therebetween, a first coil disposed on both sides of the blade in a radial direction to allow the blade to perform focusing driving and radial tilt driving, and a second coil disposed on both sides of the blade in the tangential direction to allow the blade to perform tracking driving.

A signal may be applied to the first coil to cause the blade to perform focusing driving, and an opposite signal may be applied to the first coil to cause the blade to perform radial tilting driving.

A tilting angle of the blade in the radial direction may range from about 0.5 degree to about 1 degree.

In an aspect, there is provided an optical disc drive including a main frame, a tray slidably installed in the main frame, a pickup base installed in the tray, a spindle motor installed in the pickup base and configured to rotate a disc, first and second guide shafts installed in the pickup base, an optical pickup unit configured to move in a radial direction of the disc along the first and second guide shafts, a fixing support unit fixing both ends of the first guide shaft at a fixed height, and an adjustment supporting unit supporting both ends of the second guide shaft and being configured to adjust the height of both ends of the second guide shaft.

A height of the second guide shaft may be adjusted while a height of the first guide shaft is fixed by the fixing support unit causing a tilt of the optical pickup unit in a tangential direction perpendicular to a radial direction of the disc.

The optical pickup unit may comprise at least one objective lens, and an actuator driving the at least one objective lens.

The actuator may adjust a tilt of the at least one objective lens in a radial direction of the disc.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
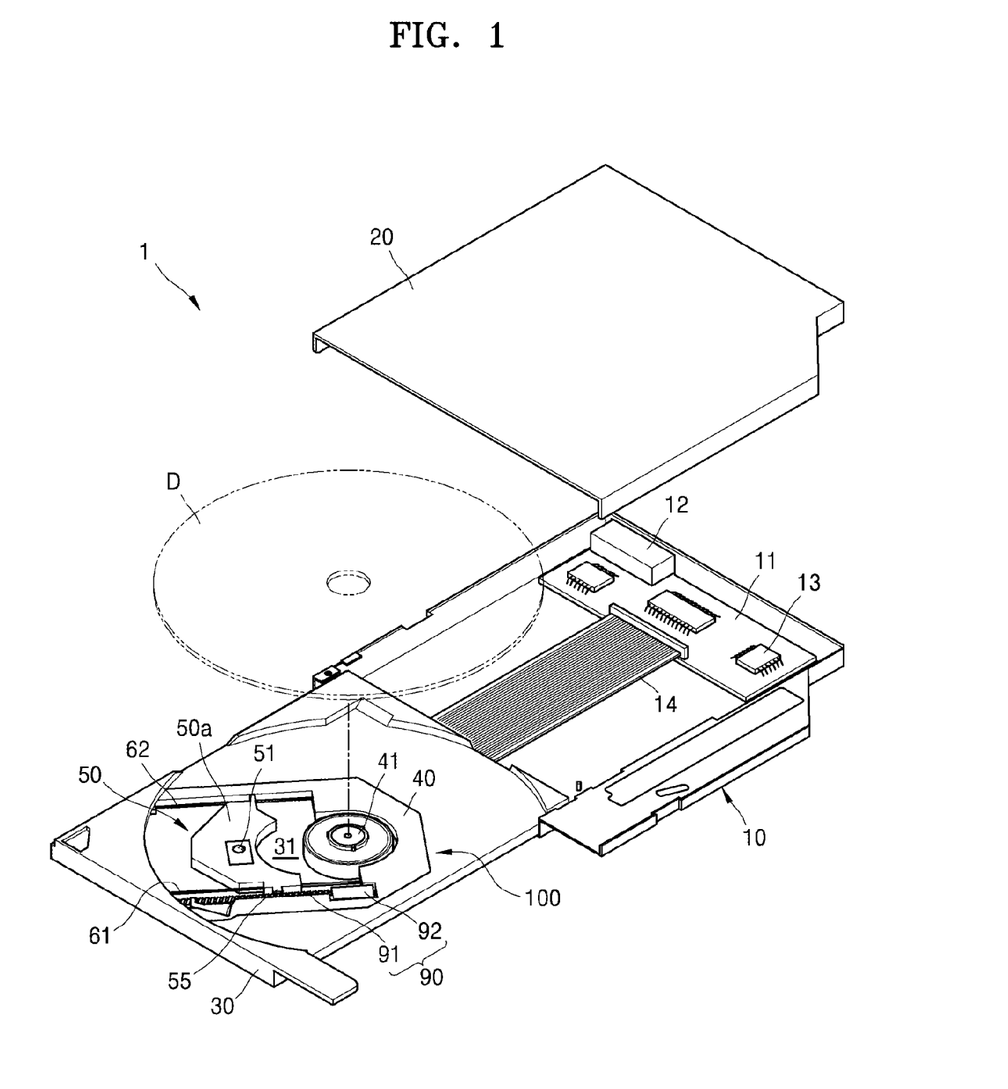
FIG. 1 is a diagram illustrating an example of an optical disc drive including a tilt adjusting apparatus.

FIG. 1 illustrates an example of an optical disc drive 1 including a tilt adjusting apparatus.

Referring to FIG. 1, the optical disc drive 1 includes a spindle motor 41 for rotating a disc D, and an optical pickup unit 50 for reading information recorded on the disc D and recording information on the disc D by emitting light onto the disc D. In this example, the optical pickup unit 50 may be moved in a radial direction of the disc D.

Here, a main frame 10 serves as a main chassis. A tray 30 on which the disc D is mounted is slidably installed in the main frame 10. A cover 20 covers an upper portion of the main frame 10 and forms a space for entering the tray 30 between the main frame 10 and the cover 20. Although not illustrated in FIG. 1, the tray 30 may further include a locking unit for selectively locking/unlocking the tray 30 with respect to the main frame 10.

The tray further includes a pickup base 40 on which the optical pickup unit 50 is seated. The spindle motor 41 is provided on the pickup base 40. A cavity portion 31 that is concavely sunken or which vertically penetrates is provided on the pickup base 40 such that the optical pickup unit 50 may slide therein. First and second guide shafts 61 and 62 are used for guiding movements of the optical pickup unit 50 and are provided at both sides of the cavity portion 31, respectively. Both ends of the optical pickup unit 50 are supported by the first and second guide shafts 61 and 62.

A pickup transfer unit 90 is provided at one side of the cavity portion 31 and is used for transferring the optical pickup unit 50. The pickup transfer unit 90 includes a lead screw 91 that has a length in a direction in which the optical pickup unit 50 is transferred, and a transfer motor 92 for rotating the lead screw 91. A lead guide 55 that is inserted in a screw groove of the lead screw 91 is provided at one side of the optical pickup unit 50. In this example, the transfer motor 92 rotates the lead screw 91 which causes the optical pickup unit 50 provided on the lead guide 55 to move. As an example, the transfer motor 92 may be a stepping motor. A rotation shaft of the transfer motor 92 may be connected to the lead screw 91 or may be integrally formed with the lead screw 91.

A main control board 11 is included on the main frame 10. A main connection portion 12 for connecting an external power apparatus (not shown) and/or a host apparatus (for example, a computer) of the optical disc drive 1 and a drive circuit portion 13 for driving the optical disc drive 1 may be included on the main control board 11. The optical pickup unit 50, the spindle motor 41, and the like, may be connected to the main control board 11 via a main connection cable 14. For example, the main connection cable 14 may be a flat cable.

Figure 2:
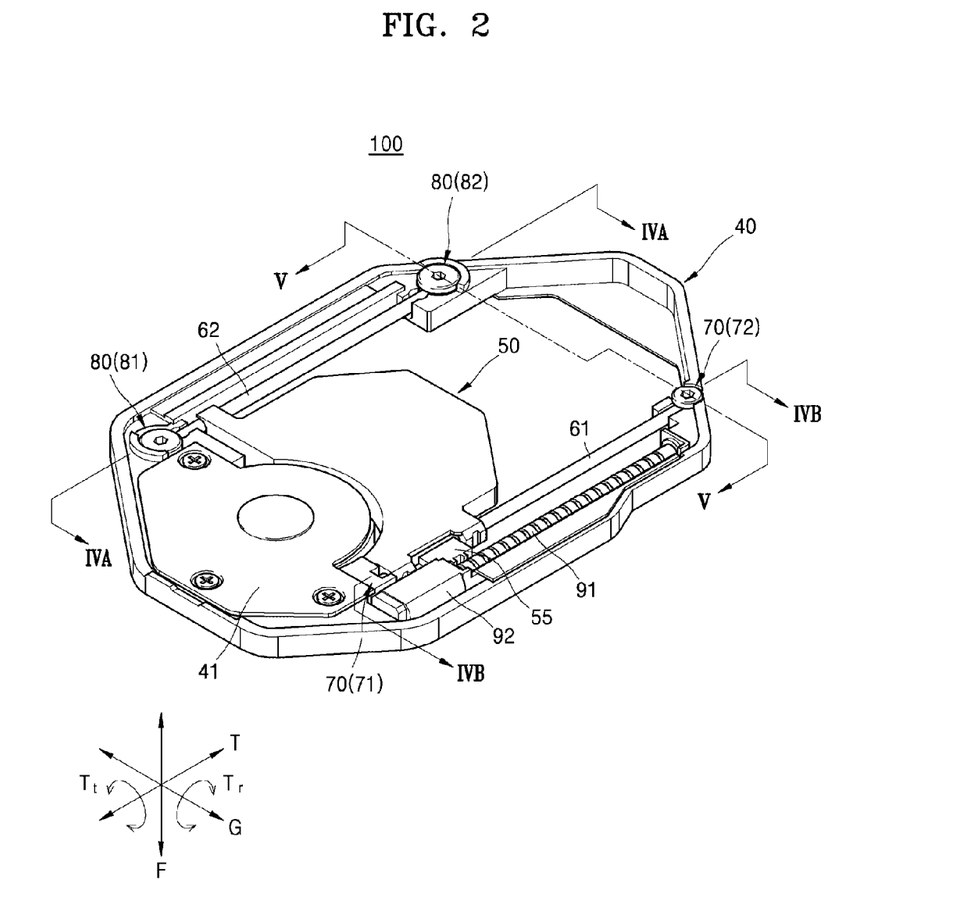
FIG. 2 is a diagram illustrating an example of a rear side of the tilt adjusting apparatus of FIG. 1.
Figure 3:
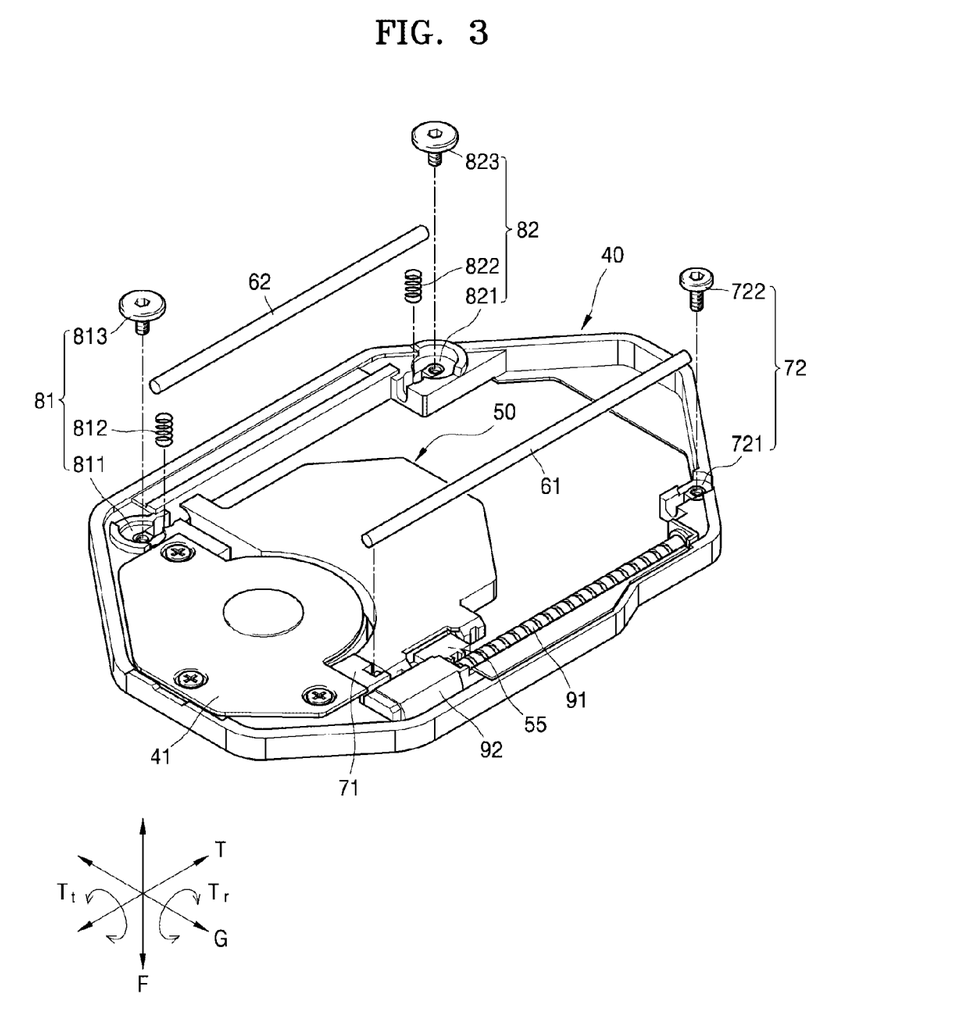
FIG. 3 is a diagram illustrating an example of a portion of the tilt adjusting apparatus of FIG. 2.

FIG. 2 illustrates an example of a rear side of the tilt adjusting apparatus of FIG. 1 and FIG. 3 illustrates an example of a portion of the tilt adjusting apparatus of FIG. 2.

Referring to FIGS. 2 and 3, tilt adjusting apparatus 100 includes the pickup base 40, the first and second guide shafts 61 and 62 installed in the pickup base 40, a fixing support unit 70 supporting both ends of the first guide shaft 61 to a fixed height, and an adjustment support unit 80 that supports both ends of the second guide shaft 62 and that may be used to adjust a height of the second guide shaft 62.

Both ends of the first guide shaft 61 are fixed using the fixing support unit 70, and the height of both ends of the second guide shaft 62 may be adjusted using the adjustment support unit 80. Thus, a tilt $T_t$ of a tangential direction G of the optical pickup unit 50 disposed between the first and second guide shafts 61 and 62 may be adjusted. In this example, the tangential direction G is a direction that is perpendicular to a radial direction T of a disc.

According to various aspects, by fixing the first guide shaft 61 disposed toward the pickup transfer unit 90, the lead screw 91 and the first guide shaft 61 may be installed to have a certain location relationship.

Figure 4A:
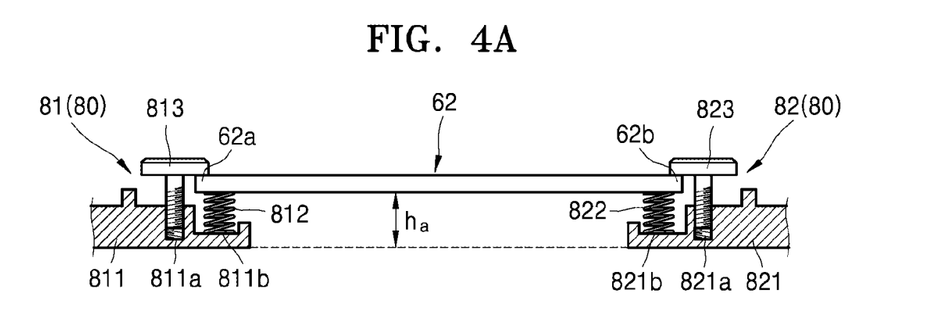
FIGS. 4A and 4B are diagrams illustrating examples of the tilt adjusting apparatus of FIG. 2.
Figure 4B:
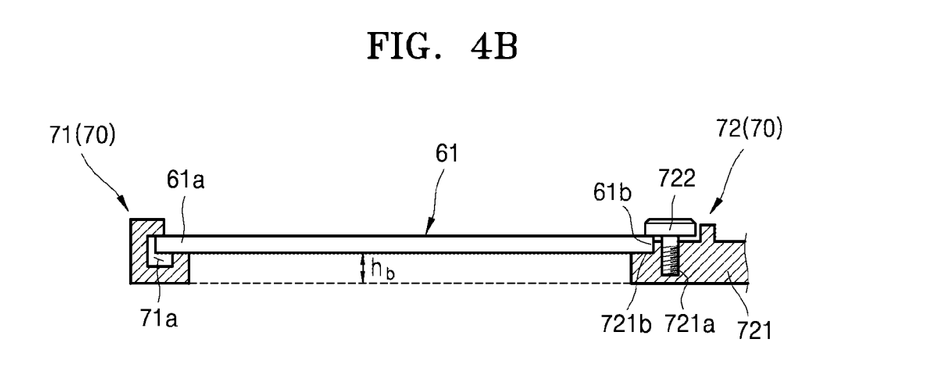

FIGS. 4A and 4B illustrate examples of the tilt adjusting apparatus of FIG. 2. FIG. 4A is a cross-sectional view taken along a line IVA-IVA of FIG. 2, and FIG. 4B is a cross-sectional view taken along a line IVB-IVB of FIG. 2.

Referring to FIG. 4A, both ends 62a and 62b of the second guide shaft 62 may rise or descend using the adjustment support unit 80. In this example, the adjustment support unit 80 includes a first adjusting unit 81 disposed at the one end 62a of the second guide shaft 62, and a second adjusting unit 82 disposed at the other end 62b of the second guide shaft 62.

In this example, the first and second adjusting units 81 and 82 each include supporting members 811 and 821 installed on the pickup base 40, elastic members 812 and 822 having one end supported by the supporting members 811 and 821 and providing elasticity to the second guide shaft 62, and adjustment screws 813 and 823 coupled to the supporting members 811 and 821. Here the underneath parts of outer circumference of the heads of the adjustment screws contact an upper part of the second guide shaft 62. Separation preventing grooves 811b and 821b for preventing separation of the elastic members 812 and 812, and coupling grooves 811a and 821a to which the adjustment screws 813 and 823 are coupled are formed in the supporting members 811 and 821.

An example of adjusting a height of the second guide shaft 62 is further described herein. When the adjustment screws 813 and 823 are individually or simultaneously rotated with respect to the coupling grooves 811a and 821a which are disposed in the both ends 62a and 62b of the second guide shaft 62, the heads of the adjustment screws 813 and 823 move upward or downward depending on the rotating direction. If the heads of the adjustment screws 813 and 823 are moved upward, due to the elasticity of the elastic members 812 and 822, the second guide shaft 62 rises. In contrast, if the heads of the adjustment screws 813 and 823 are moved downward, the second guide shaft 62 contacting the lower parts of the heads descends. Accordingly, based on the rotation of the adjusting screws 813 and 823, the second guide shaft 62 rises or descends. Based on reference surfaces of the supporting members 811 and 821, a height $h_a$ of the second guide shaft 62 is adjusted by the adjustment screws 813 and 823. It should be appreciated that the supporting members 811 and 821 may be integrally formed with the pickup base 40, but are not limited thereto, and may be formed separately from the pickup base 40.

Referring to FIG. 4B, both ends 61a and 61b of the first guide shaft 61 are supported at a height $h_b$ by the fixing support unit 70. The fixing support unit 70 is disposed at the both ends 61a and 61b and may have a different shape to easily assemble and fix the first guide shaft 61.

For example, a first fixing unit 71 inserts and fixes one end 61a of the first guide shaft 61, and a second fixing unit 72 engages and helps to fix the other end 61b of the first guide shaft 61. To insert and fix the end 61a of the first guide shaft 61, the first fixing unit 71 may include an inserting hole 71a fixing the first guide shaft 61 by inserting the first guide shaft 61 therein. The second fixing unit 72 may include a supporting member 721 installed on the pickup base 40 and supporting the other end 61b of the first guide shaft 61, and a fixing member 722 coupled to the supporting member 721 and helping to fix the other end 61b of the first guide shaft 61 to the supporting member 721. For example, a screw, bolt, and the like may be used as the fixing member 722. Because an underneath part of the outer circumference of the head of the fixing member 722 is coupled to the supporting member 721 while contacting an upper portion of the first guide shaft 61, the other end 61b of the first guide shaft 61 is fixed to the supporting member 721. A coupling groove 721a to which the fixing member 722 is coupled is formed in the supporting member 721. A contacting portion 721b directly contacting the first guide shaft 61 is included in the supporting member 721.

A process of supporting the both ends 61a and 61b of the first guide shaft 61 to the fixed height $h_b$ is illustrated in FIG. 4B. Here, one end 61a of the first guide shaft 61 is inserted in the inserting hole 71a of the first fixing unit 71 and thus the one end 61a is firmly fixed not to move. Next, while contacting the other end 61b of the guide shaft 61 with the contacting portion 721b of the supporting member 721, the fixing member 722 may be coupled to the coupling groove 721a, and thus the other end 61b of the first guide shaft 61 is fixed. By doing so, both ends 61a and 61b of the first guide shaft 61 are fixed at a certain height $h_b$. The height $h_b$ refers to the height of the first guide shaft 61 based on a reference surface of the supporting member 721. It should be appreciated that the supporting member 721 of the first and second fixing units 71 and 72 may be integrally formed with the pickup base 40, but is not limited thereto, and may be formed separately from the pickup base 40.

Figure 5:
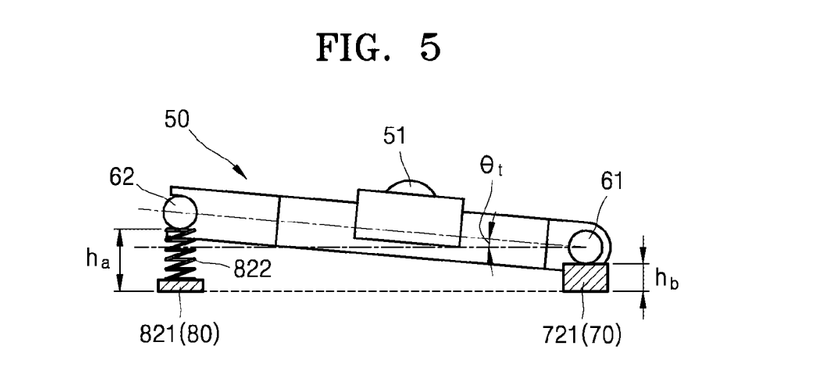
FIG. 5 is a diagram illustrating an example of the tilt adjusting apparatus of FIG. 2 taken along a line V-V of FIG. 2.

FIG. 5 illustrates an example of a cross-sectional view of the tilt adjusting apparatus of FIG. 2 taken along a line V-V of FIG. 2. Referring to FIG. 5, a height of the first guide shaft 61 in which the fixing support unit 70 is installed is fixed without a rise or a descent, while a height of the second guide shaft 62 in which the adjustment supporting unit 80 is installed may be adjusted by a rise or a descent. That is, using the first guide shaft 61 fixed to the height $h_b$ as a reference axis, the height $h_a$ of the second guide shaft 62 may be adjusted, and thus a tilt of the optical pickup unit 50 provided between the first and second guide shafts 61 and 62 may be adjusted by θt in the tangential direction G.

According to various aspects, while fixing both ends 61a and 61b of the first guide shaft 61, the tilt of the tangential direction G may be adjusted by only adjusting the height $h_a$ of the ends 62a and 62b of the second guide shaft 62. Because the heights of only the two points among the four points supporting the first and second guide shafts 61 and 62 are adjusted, tilt adjustment is simplified. Also, by reducing usage of the adjustment supporting unit 80 which has a relatively complicated structure and needs relatively more components, manufacturing cost and labor may be reduced, and thus a cost competitiveness may be obtained.

According to various aspects, to simplify the tilt adjustment of the optical pickup unit 50, the apparatus herein fixes both ends 61a and 61b of the first guide shaft 61 and adjusts only the height of the second guide shaft 62 by rising or descending both ends 62a and 62b of the second guide shaft 62. According to various aspects, components necessary for adjusting tilt of the first and second guide shafts 61 and 62 in the radial direction T are removed. Also, tilt adjustment in the radial direction T may use electronic tilt adjustment of the optical pickup unit 50.

Figure 6:
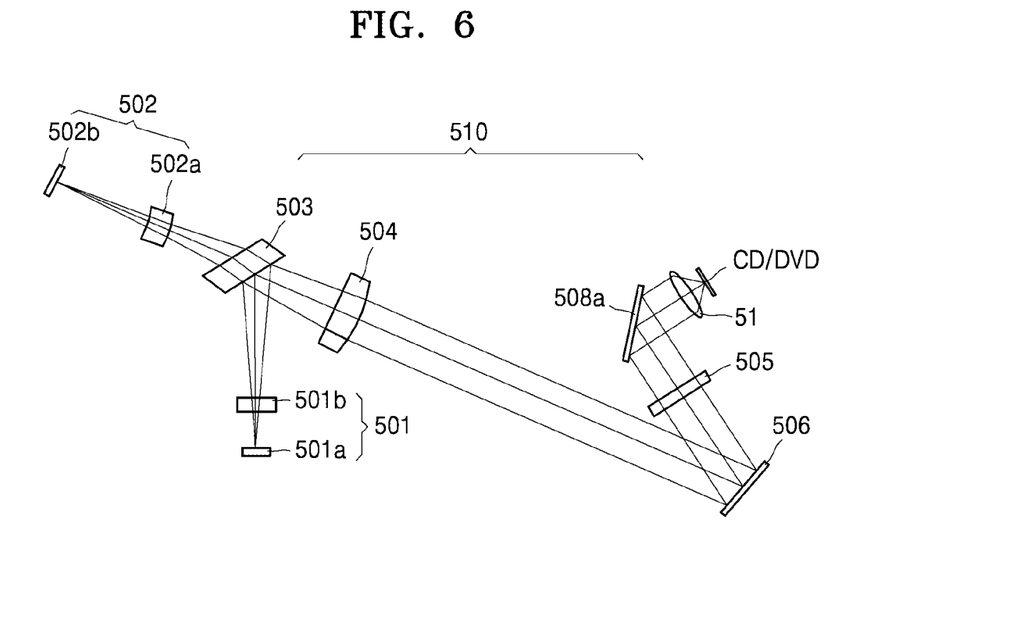
FIG. 6 is a diagram illustrating an example of an optical configuration of an optical pickup unit.

FIG. 6 illustrates an example of an optical configuration of an optical pickup unit of FIG. 1. The optical configuration of the optical pickup unit 50 of FIG. 2 corresponds to a CD/DVD. Referring to FIG. 6, the optical pickup includes a light transmission system 510 and a light source system 501 for providing a plurality of beams to record and reproduce information with respect to a CD/DVD. For example, the light source system 501 may provide three beams including a main beam at a center thereof and first and second sub-beams at opposite sides of the main beam. The optical pickup unit also includes a light receiving system 502 for generating electrical signals used to process data signals or tracking error signals (TES) that are received by a light receiving element 502b having three light receiving cells that receive the three beams reflected from the CD/DVD for reproduction of information.

The light source system 501 includes a light source 501a for a CD/DVD and a grating element 501b. A beam emitted from the light source 501a for a CD/DVD is incident on a first beam splitter 503 via the grating element 501b. In this example, the grating element 501b may form a main beam and ±1st sub-beams from the single incident beam by a grating effect.

The light receiving system 502 includes the light receiving element 502b that detects the three beams reflected from the CD/DVD and passing through the first beam splitter 503, and a sensing lens 502a that focuses the main beam and the first and second sub-beams into sizes suitable for the light receiving element 502b.

The light transmission system 510 includes an object lens 51 corresponding to the CD/DVD, optical path changing mirrors 506 and 508a, a quarter wave plate (QWP) 505, a collimating lens 504, and the first beam splitter 503. The first beam splitter 503 may reflect the three beams output from the light source system 501 toward the object lens 51 via the optical path changing mirrors 506 and 508a and simultaneously transmit the light reflected from the CD/DVD via the optical path changing mirrors 506 and 508a to be incident on the light receiving system 502.

Figure 7:
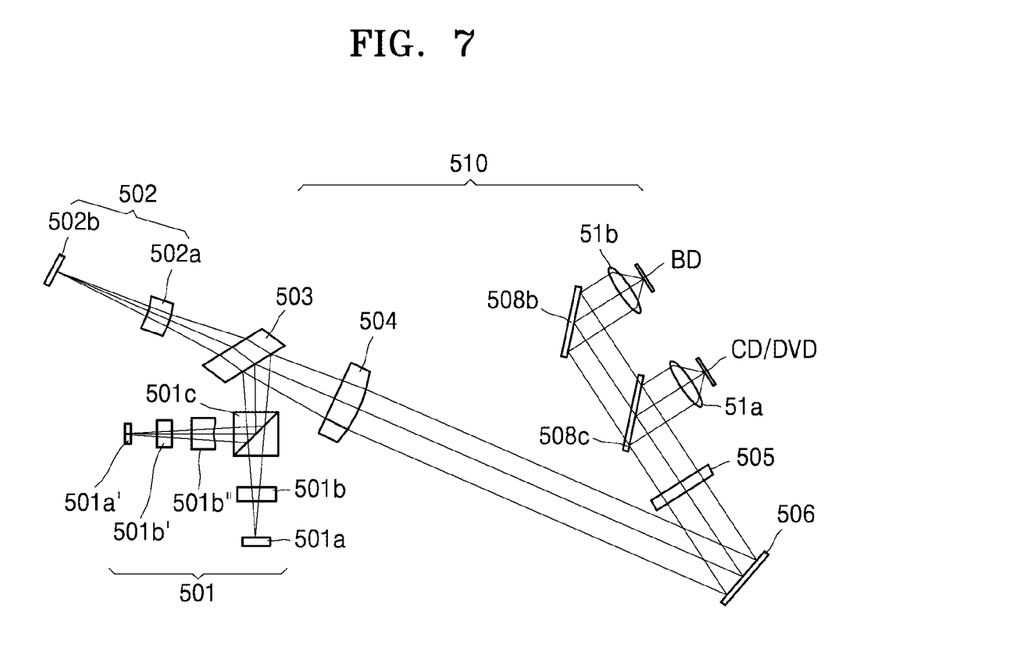
FIG. 7 is a diagram illustrating another example of an optical configuration of an optical pickup unit.

FIG. 7 illustrates another example of an optical configuration of the optical pickup unit 50 of FIG. 1. The optical configuration of the optical pickup unit of FIG. 7 corresponds to both a CD/DVD and a Blu-ray disc (BD).

Referring to FIG. 7, a total reflection mirror 508b is arranged at an incident side of an object lens 51b corresponding to a BD and a dichroic mirror 508c that allows a transmittance of a blue light is arranged at an incident side of an object lens 51a corresponding to a CD/DVD. The total reflection mirror 508b and the dichroic mirror 508c are arranged on an optical path from the optical path changing mirror 506. The optical path changing mirror 506 may reflect the light from the first beam splitter 503 toward the total reflection mirror 508b and the dichroic mirror 508c and may reflect the light reflected from the CD/DVD and BD via the total reflection mirror 508b and the dichroic mirror 508c toward the first beam splitter 503.

The light source system 501 includes the light source 501a for a CD/DVD and a light source 501a' for a BD corresponding to the CD/DVD and the BD, respectively, and emitting light beams toward two incident surfaces of a second beam splitter 501c having a cubic structure. A coupling lens 501b" is provided between the light source 501a' for a BD and the second beam splitter 501c. The coupling lens 501b" may adjust an optical distance from the light source 501a' for a BD to the BD by adjusting an optical magnifying power. For example, the coupling lens 501b" may adjust a defocus amount of a proceeding light. The light emitted from the two light sources 501a and 501a' may proceed toward the first beam splitter 503 via the second beam splitter 501c. The grating element 501b for a CD/DVD and a grating element 501b' for a BD, which form the main beam and the ±1st sub-beams, are respectively arranged between the second beam splitter 501c and the two light sources 501a and 501a'.

Figure 8:
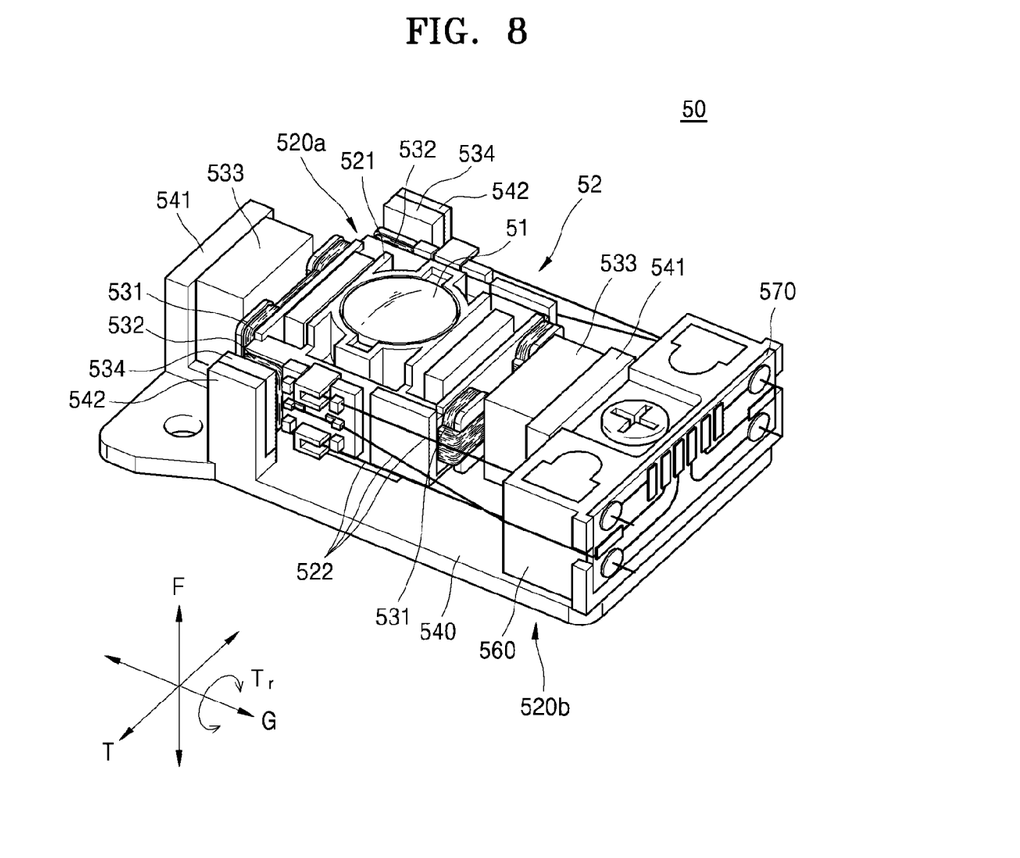
FIG. 8 is a diagram illustrating an example of an actuator of an optical pickup unit.

The optical components described herein, for example, the optical components of the light transmission system 510, the light source system 501 and the light receiving system 502, may be arranged on the optical pickup unit 50. The object lens 51 may be actuated in a focusing direction, a tracking direction or a radial tilt direction, to accurately access information from the disc D. To this end, an actuator 52 is provided. FIG. 8 illustrates an actuator 52 according to various aspects. The actuator 52 of FIG. 8 is an example of the actuator 52 applied to the optical pickup unit 50 having one object lens 51.

Referring to FIG. 8, the object lens 51 is mounted on a blade 521. Drive coils 531 and 532 are provided on the blade 521. For example, the drive coil 531 may be for tracking driving to actuate the blade 521 in a tracking direction T, whereas the drive coil 532 may be for focusing driving to actuate the blade 521 in a focusing direction F. Two pairs of drive coils 531 may be arranged, for example, at each of opposite lateral portions of the blade 521 in a tangential direction G. The drive coils 532 may be arranged, for example, at the opposite lateral portions of the blade 521 in the tracking direction T, that is, the radial tilt direction. In this example, the blade 521 forms a movable body 520a including the object lens 51 and the drive coils 531 and 532.

To form a magnetic circuit for tracking driving, two permanent magnets 533 may be arranged corresponding to the four drive coils 531. A yoke 541 may be arranged outside the two permanent magnets 533. Yoke 541 is an outer yoke that supports the permanent magnet 533 and forms a magnetic circuit in a closed circuit, thus increasing an electromagnetic force to actuate the blade 521.

A permanent magnet 534 may form a magnetic circuit for focusing and radial tilt driving, with the drive coils 532. Yoke 542 is an outer yoke that supports the permanent magnet 534.

An electromagnetic force in the same direction, that is, in a −F direction or a +F direction, is generated in the pair of drive coils 532 by adjusting the direction of a current flowing in the drive coils 532 which are arranged at the opposite lateral sides of the blade 521 in the tracking direction T. Accordingly, the blade 521 may be focusing driven.

For example, by generating electromagnetic forces in the opposite directions in the pair of drive coils 532, that is, in the −F direction and the +F direction, radial tilt driving is possible so that the blade 521 may be actuated in a radial tilt direction Tr. Therefore, tilt adjustment of the optical unit 50 in a radial direction is possible.

The blade 521 is supported by a plurality of suspension wires 522. For example, the suspension wires 522 may be arranged at opposite lateral sides of the blade 521 in the tracking direction T and extend in the tangential direction G. One end of each of the suspension wires 522 may be fixed to a wire holder 570, whereas the other end thereof may be fixed on the blade 521. Although not illustrated, a circuit board for fixing the suspension wires 522 may be included at the opposite lateral sides of the blade 521 in the tracking direction T and the suspension wires 522 may be electrically connected to the drive coils 531 and 532 through the circuit board.

The permanent magnets 533 and 534, the yokes 541 and 542, and a support portion 560 form a fixed body 502b. The fixed body 502b may be fixed, for example, on a body 50a of the optical pickup unit 50 of FIG. 1. In this example, the movable body 520a is elastically supported by the suspension wires 522 with respect to the fixed body 502b. The wire holder 570 may be fixed on the support portion 560 and the support portion 560 may be coupled to, for example, the yoke structure 540.

Figure 9:
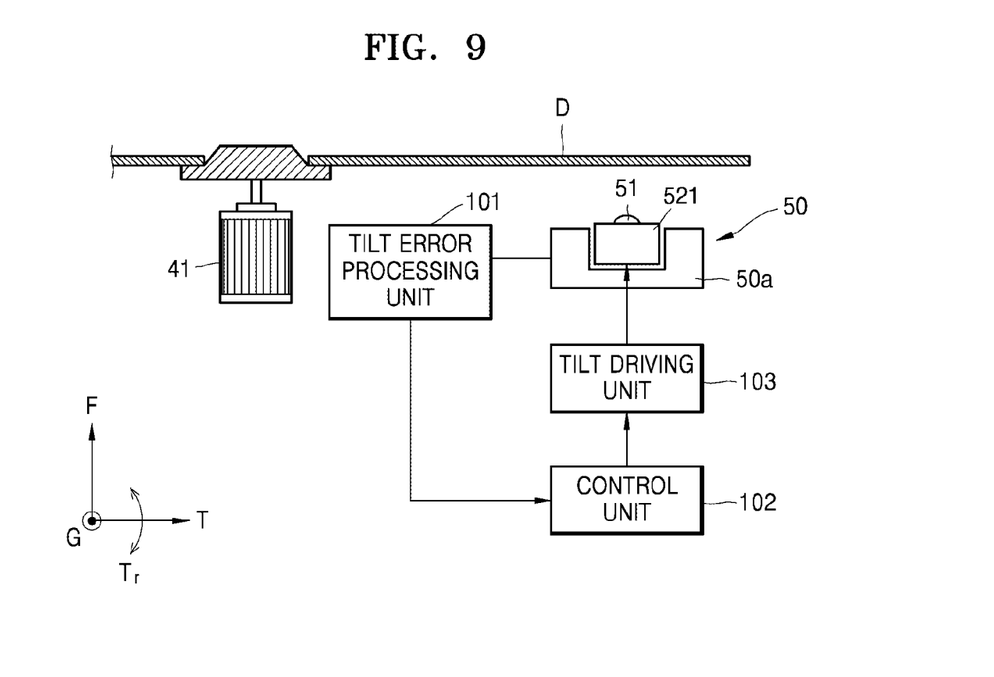
FIG. 9 is a diagram illustrating an example of tilt compensation that is performed by the optical pickup unit.
Figure 10:
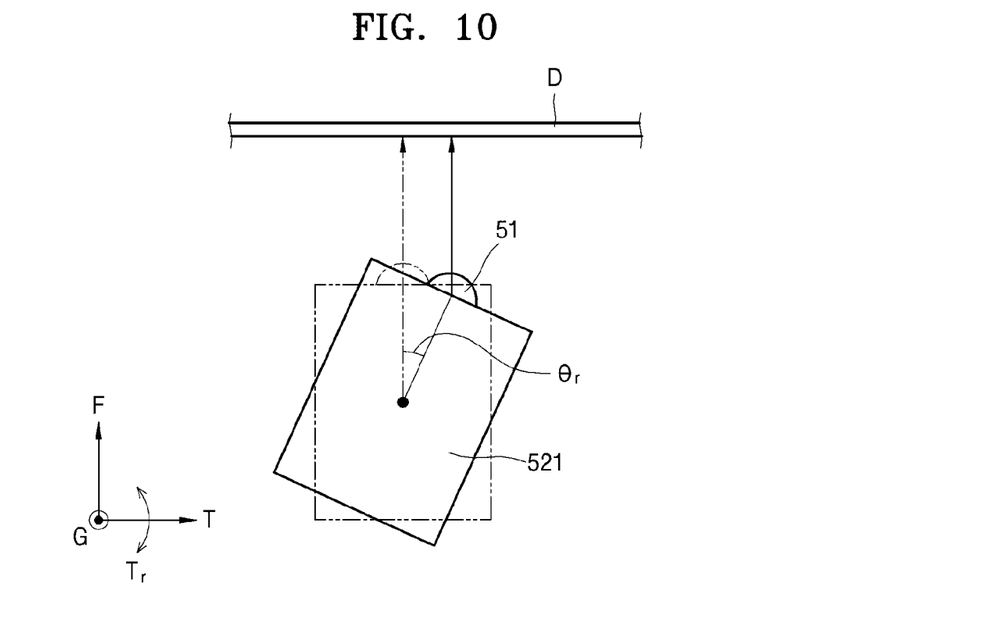
FIG. 10 is a diagram illustrating an example of an operating status of a blade of FIG. 9.

FIG. 9 illustrates an example in which tilt compensation is performed by the optical pickup unit 50. FIG. 10 illustrates an example of an operating status of the blade 521 of FIG. 9.

Referring to FIG. 9, the optical pickup unit 50 includes the blade 521 having the object lens 51 mounted thereon. As described with reference to FIG. 8, focusing driving, tracking driving, and radial tilting driving are capable of being performed.

Beams that are reflected from the disc D may be detected using a light detecting device (not shown) provided in the optical pickup unit 50, and photoelectrically transformed into electrical signals. The electrical signals may be processed in a tilt error processing unit 101.

For example, the tilt error processing unit 101 may process tilt error signals of the blade 521 from the electrical signals. The tilt error signals may be input to a control unit 102. Based on the tilt error signals, the control unit 102 may determine whether to operate a tilt driving unit 103 and a tilt compensation value. For example, if the tilt error signals are within a permissible range, the control unit 102 may determine not to tilt the blade 521. As another example, if the tilt error signals exceeds the permissible range, the control unit 102 may control the tilt driving unit 103 to drive the blade 521 that has the object lens 51 mounted thereon, in the radial tilt direction Tr.

Referring to FIG. 10, if it is determined that the blade 521 is tilted by a predetermined angle in the radial direction T, the control unit 102 may determine whether the angle is within the permissible range. For example, if the angle exceeds the permissible range, the control unit 102 may control the tilt driving unit 103. The tilt driving unit 103 tilts the blade 521 by an angle $\theta_r$ corresponding to the tilted angle of the blade 521 to compensate for the error in the radial tilt direction $T_r$. As merely an example, a tilting angle $\Delta\theta_r$ of the blade 521 in the radial direction may range from about 0.5 degree to about 1 degree.

According to various aspects, provided is a tilt adjusting apparatus and an optical disc drive using the same. The tilt adjusting apparatus may adjust a height of a second guide shaft while a first guide shaft among a pair of guide shafts is fixed to adjust for a tilt in an object lens. The tilt adjusting apparatus reduces the components necessary for tilt adjustment and simplifies a tilt adjusting method. Accordingly, cost may be reduced and productivity may be increased.

According to various aspects, a height of the first guide shaft of the optical pickup unit is fixed at a predetermined height, while a height of the second guide shaft is capable of being adjusted up and down resulting in the guide shaft being titled with respect to the surface of a disc. Accordingly, tilt of the disc that occurs due to error may be corrected or compensated for by the tilt adjusting apparatus.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A tilt adjusting apparatus of an optical disc drive, the tilt adjusting apparatus comprising:
   a pickup base;
   first and second guide shafts installed in the pickup base;
   an optical pickup unit configured to tilt and move along the first and second guide shafts in a radial direction of a disc configured to receive light emitted from the optical pickup unit;
   a fixing support unit that supports ends of the first guide shaft at a fixed height; and
   an adjustment supporting unit supporting ends of the second guide shaft and being configured to adjust a height of the ends of the second guide shaft; and
      wherein the optical pickup unit comprises at least one objective lens, and an actuator driving the at least one objective lens, and
      the actuator comprises
         a blade supporting the at least one objective lens, and
         a first coil disposed at sides of the blade in the radial direction of the disc to allow the blade to perform focusing driving and radial tilt driving.

2. The tilt adjusting apparatus of claim 1, wherein the height of the ends of the second guide shaft is adjustable while the fixed height of the ends of the first guide shaft is fixed by the fixing support, thereby enabling the optical pickup unit to tilt in a tangential direction perpendicular to the radial direction of the disc.

3. The tilt adjusting apparatus of claim 1, wherein the fixing support unit comprises a first fixing unit receiving and fixing one end of the first guide shaft, and a second fixing unit engaging and fixing another end of the first guide shaft.

4. The tilt adjusting apparatus of claim 3, wherein the second fixing unit comprises a supporting member installed in the pickup base and supporting a first portion of the first guide shaft at the second fixing unit, and a fixing member coupled to the supporting member and fixing a second portion of the first guide shaft to the supporting member at the second fixing unit.

5. The tilt adjusting apparatus of claim 4, wherein the supporting member comprises a coupling groove to which the fixing member is coupled, and a contacting portion contacting the first guide shaft.

6. The tilt adjusting apparatus of claim 1, wherein the adjustment supporting unit comprises a first adjusting unit supporting one end of the second guide shaft and being configured to adjust the height thereof, and a second adjusting unit supporting another end of the second guide shaft and being configured to adjust the height thereof.

7. The tilt adjusting apparatus of claim 6, wherein the first and second adjusting units each comprise:
   a supporting member installed in the pickup base;
   an elastic member that has one end supported by the supporting member and which provides elasticity to the second guide shaft; and
   an adjusting screw coupled to the supporting member and having a head contacting the second guide shaft.

8. The tilt adjusting apparatus of claim 7, wherein the supporting member comprises a separation preventing groove configured to prevent separation of the elastic member from the supporting member, and a coupling groove to which the adjusting screw is coupled.

9. The tilt adjusting apparatus of claim 1, further comprising a pickup transfer unit that is configured to transfer the optical pickup unit, wherein the first guide shaft is disposed toward the pickup transfer unit.

10. The tilt adjusting apparatus of claim 9, wherein the pickup transfer unit comprises a lead screw that is disposed in parallel with the first guide shaft, and a transfer motor rotating the lead screw.

11. The tilt adjusting apparatus of claim 1, wherein the actuator further comprises a second coil disposed at sides of the blade in a tangential direction perpendicular to the radial direction of the disc to allow the blade to perform tracking driving.

12. A tilt adjusting apparatus of an optical disc drive, the tilt adjusting apparatus comprising:
   a pickup base;
   first and second guide shafts installed in the pickup base;
   an optical pickup unit configured to tilt and move along the first and second guide shafts in a radial direction of a disc configured to receive light emitted from the optical pickup unit;
   a fixing support unit that supports ends of the first guide shaft at a fixed height; and
   an adjustment supporting unit supporting ends of the second guide shaft and being configured to adjust a height of the ends of the second guide shaft;
      wherein the optical pickup unit comprises at least one objective lens, and an actuator driving the at least one objective lens; and
   the actuator comprises
      a blade supporting the at least one objective lens;
      suspension wires extending in a tangential direction perpendicular to the radial direction of the disc and supporting the blade to elastically move;
      magnetic members that are facing each other and that have the blade provided therebetween;
      a first coil disposed at sides of the blade in the radial direction of the disc to allow the blade to perform focusing driving and radial tilt driving; and
      a second coil disposed at sides of the blade in the tangential direction to allow the blade to perform tracking driving.

13. The tilt adjusting apparatus of claim 12, wherein the first coil is configured to cause the blade to perform focusing driving in response to a first signal, and the first coil is configured to cause the blade to perform radial tilting driving in response to a second signal opposite the first signal.

14. The tilt adjusting apparatus of claim 12, wherein a tilting angle of the blade in the radial direction ranges from about 0.5 degree to about 1 degree.

15. An optical disc drive comprising:
   a main frame;
   a tray slidably installed in the main frame;
   a pickup base installed in the tray;
   a spindle motor installed in the pickup base and configured to rotate a disc;
   first and second guide shafts installed in the pickup base;
   an optical pickup unit configured to tilt and move along the first and second guide shafts in a radial direction of a disc configured to receive light emitted from the optical pickup unit;
   a fixing support unit fixing ends of the first guide shaft at a fixed height; and
   an adjustment supporting unit supporting ends of the second guide shaft and being configured to adjust a height of the ends of the second guide shaft;
      wherein the optical pickup unit comprises at least one objective lens, and an actuator driving the at least one objective lens, and
   the actuator comprises
      a blade supporting the at least one objective lens, and
      a first coil disposed at sides of the blade in the radial direction of the disc to allow the blade to perform focusing driving and radial tilt driving.

16. The optical disc drive of claim 15, wherein the height of the ends of the second guide shaft is adjustable while the fixed height of the first guide shaft is fixed by the fixing support unit, thereby enabling the optical pickup unit to tilt in a tangential direction perpendicular to the radial direction of the disc.

17. The optical disc drive of claim 15, wherein the actuator further comprises
   a second coil disposed at sides of the blade in a tangential direction perpendicular to the radial direction of the disc to allow the blade to perform tracking driving.

18. The optical disc drive of claim 17, wherein the actuator further comprises
   suspension wires extending in the tangential direction and supporting the blade to elastically move; and
   magnetic members that are facing each other and that have the blade provided therebetween.

19. The optical disc drive of claim 15, wherein the actuator further comprises
   suspension wires extending in a tangential direction perpendicular to the radial direction of the disc and supporting the blade to elastically move; and
   magnetic members that are facing each other and that have the blade provided therebetween.

* * * * *